United States Patent
Onggosanusi et al.

(10) Patent No.: US 10,218,470 B2
(45) Date of Patent: Feb. 26, 2019

(54) SECONDARY SYNCHRONIZATION SIGNAL MAPPING

(71) Applicant: Intel Corporation, Santa Clara, CA (US)

(72) Inventors: Eko Nugroho Onggosanusi, Allen, TX (US); Anand Ganesh Dabak, Plano, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/729,064

(22) Filed: Oct. 10, 2017

(65) Prior Publication Data

US 2018/0123750 A1    May 3, 2018

Related U.S. Application Data

(60) Continuation of application No. 14/458,515, filed on Aug. 13, 2014, now Pat. No. 9,806,859, which is a
(Continued)

(51) Int. Cl.
*H04J 11/00* (2006.01)
*H04L 5/00* (2006.01)
(Continued)

(52) U.S. Cl.
CPC ........ *H04L 5/0007* (2013.01); *H04J 11/0073* (2013.01); *H04J 11/0076* (2013.01);
(Continued)

(58) Field of Classification Search
None
See application file for complete search history.

(56) References Cited

U.S. PATENT DOCUMENTS

| 6,731,673 B1 | 5/2004 | Kotov et al. |
| 7,095,811 B1 | 8/2006 | Shikh-Bahaei et al. |

(Continued)

FOREIGN PATENT DOCUMENTS

| CN | 1802805 A | 7/2006 |
| CN | 1835638 A | 9/2006 |

(Continued)

OTHER PUBLICATIONS

"U.S. Appl. No. 12/234,362, Final Office Action dated Dec. 18, 2013", 15 pgs.

(Continued)

*Primary Examiner* — Jutai Kao (74) *Attorney, Agent, or Firm* — Schwegman Lundberg & Woessner, P.A.

(57) ABSTRACT

Embodiments of the present disclosure provide a transmitter, a receiver and methods of operating a transmitter or a receiver. In one embodiment, the transmitter is for use with a base station and includes a primary module configured to provide a primary synchronization signal. The transmitter also includes a secondary mapping module configured to provide a secondary synchronization signal derived from two sequences taken from a same set of N sequences and indexed by an index pair $(S_1, S_2)$ with $S_1$ and $S_2$ ranging from zero to N−1, wherein the index pair $(S_1, S_2)$ is contained in a mapped set of index pairs corresponding to the same set of N sequences that defines a cell identity group. Additionally, the transmitter further includes a transmit module configured to transmit the primary and secondary synchronization signals.

25 Claims, 8 Drawing Sheets

Related U.S. Application Data division of application No. 12/234,362, filed on Sep. 19, 2008, now Pat. No. 9,025,586.

(60) Provisional application No. 60/978,188, filed on Oct. 8, 2007, provisional application No. 60/975,393, filed on Sep. 26, 2007, provisional application No. 60/975,062, filed on Sep. 25, 2007, provisional application No. 60/974,342, filed on Sep. 21, 2007.

(51) Int. Cl.

| | | |
|---|---|---|
| *H04L 27/26* | (2006.01) | |
| *H04W 36/00* | (2009.01) | |
| *H04W 48/16* | (2009.01) | |
| *H04W 56/00* | (2009.01) | |

(52) U.S. Cl.
CPC ........ *H04L 5/0048* (2013.01); *H04L 27/2613* (2013.01); *H04L 27/2655* (2013.01); *H04W 36/0083* (2013.01); *H04W 48/16* (2013.01); *H04W 56/001* (2013.01)

(56) References Cited

U.S. PATENT DOCUMENTS

| | | | |
|---|---|---|---|
| 9,025,586 | B2 | 5/2015 | Onggosanusi et al. |
| 9,806,859 | B2 | 10/2017 | Onggosanusi |
| 2002/0064211 | A1 | 5/2002 | Chen et al. |
| 2002/0146041 | A1 | 10/2002 | Demir et al. |
| 2004/0090993 | A1 | 5/2004 | Sriram |
| 2004/0246998 | A1 | 12/2004 | Ma et al. |
| 2008/0181194 | A1* | 7/2008 | Lindoff ................ H04J 11/0069 370/350 |
| 2008/0232528 | A1* | 9/2008 | Imamura .............. H04J 11/0069 375/365 |
| 2008/0273522 | A1* | 11/2008 | Luo ...................... H04J 11/0076 370/350 |
| 2008/0285433 | A1* | 11/2008 | Akita ...................... H04L 5/005 370/204 |
| 2008/0291892 | A1 | 11/2008 | Luo |
| 2009/0067370 | A1 | 3/2009 | Kim et al. |
| 2010/0135257 | A1 | 6/2010 | Higuchi et al. |
| 2011/0194401 | A1 | 8/2011 | Akita et al. |
| 2014/0348145 | A1 | 11/2014 | Onggosanusi |

FOREIGN PATENT DOCUMENTS

| | | |
|---|---|---|
| JP | 11275002 A | 10/1999 |
| KR | 20070050356 A | 5/2007 |

OTHER PUBLICATIONS

"U.S. Appl. No. 12/234,362, Non Final Office Action dated Apr. 25, 2012", 16 pgs.
"U.S. Appl. No. 12/234,362, Non Final Office Action dated Jun. 23, 2011", 13 pgs.
"U.S. Appl. No. 12/234,362, Notice of Allowance dated Jul. 1, 2014", 7 pgs.
"U.S. Appl. No. 12/234,362, Response filed Feb. 1, 2013 to Non Final Office Action dated Apr. 25, 2012", 21 pgs.
"U.S. Appl. No. 12/234,362, Response filed Jun. 12, 2014 to Final Office Action dated Dec. 18, 2013", 6 pgs.
"U.S. Appl. No. 12/234,362, Response filed Dec. 14, 2011 to Non Final Office Action dated Jun. 23, 2011", 19 pgs.
"U.S. Appl. No. 14/458,515, Non Final Office Action dated Jan. 6, 2017", 11 pgs.
"U.S. Appl. No. 14/458,515, Notice of Allowance dated Jun. 29, 2017", 7 pgs.
"U.S. Appl. No. 14/458,515, Preliminary Amendment dated Aug. 13, 2014", 6 pgs.
"U.S. Appl. No. 14/458,515, Response filed Apr. 6, 2017 to Non Final Office Action dated Jan. 6, 2017", 7 pgs.
"Chinese Application Serial No. 201510042329.9, Office Action dated Apr. 24, 2017", (w/ English Translations) 9 pgs.
"Chinese Application Serial No. 201510042329.9, Response filed Jan. 26, 2018 to Office Action dated Apr. 24, 2017", (W/ English Claims), 20 pgs.
"European Application Serial No. 08831766.4, Extended European Search Report dated Feb. 22, 2016", 9 pgs.
"European Application Serial No. 08831766.4, Response filed Sep. 16, 2016 to Extended European Search Report dated Feb. 22, 2016", 10 pgs.
U.S. Appl. No. 12/234,362, now U.S. Pat. No. 9,025,586, filed Sep. 19, 2008, Secondary Synchronization Signal Mapping.
U.S. Appl. No. 14/458,515, now U.S. Pat. No. 9,806,859, filed Aug. 13, 2014, Secondary Synchronization Signal Mapping.
"3rd Generation Partnership Project; Technical Specification Group Radio Access Network; Evolved Universal Terrestrial Radio Access (E-UTRA); Physical Channels and Modulation (Release 8)", 3GPP Draft; 36.211 V1.2.2, 3rd Generation Partnership Project (3GPP), Mobile Competence Centre; 650, Route Des Lucioles; F-06921 Sophia-Antipolis Cedex; France, (Aug. 19, 2007), 47 pgs.
"Chinese Application Serial No. 201510042329.9, Office Action dated Apr. 27, 2018", w/English Claims, 9 pgs.
"Chinese Application Serial No. 201510042329.9, Response filed Jul. 12, 2018 to Office Action dated Apr. 27, 2018", W/ English Claims, 19 pgs.
"European Application Serial No. 08831766.4, Communication Pursuant to Article 94(3) EPC dated Mar. 5, 2018", 5 pgs.
"European Application Serial No. 08831766.4, Response filed Jul. 3, 2018 to Communication Pursuant to Article 94(3) EPC dated Mar. 5, 2018", 9 pgs.
"European Application Serial No. 18154646.6, Extended European Search Report dated Apr. 23, 2018", 6 pgs.
"Technical Specification Group Radio Access Network; Physical Channels and Modulation (Release 8)", 3GPP TS 36.211 v1.0.0, (Mar. 2007), 1-30.
"Chinese Application Serial No. 201510042329.9, Office Action dated Sep. 25, 2018", W/ English Translation, 7 pgs.
"Chinese Application Serial No. 201510042329.9, Response filed Dec. 7, 2018 to Office Action dated Sep. 25, 2018", W/ English Claims, 17 pgs
"European Application Serial No. 18154646.6, Response filed Nov. 13, 2018 to Extended European Search Report dated Apr. 23, 2018", 17 pgs.

* cited by examiner

SECONDARY SYNCHRONIZATION SIGNAL MAPPING

CROSS-REFERENCE TO PROVISIONAL APPLICATION

This application is a continuation of U.S. patent application Ser. No. 14/458,515, filed Aug. 13, 2014, now issued as U.S. Pat. No. 9,806,859, which is a divisional of U.S. patent application Ser. No. 12/234,362, filed Sep. 19, 2008, now issued as U.S. Pat. No. 9,025,586, which claims the benefit of U.S. Provisional Application No. 60/974,342, filed on Sep. 21, 2007; 60/975,062, filed Sep. 25, 2007; 60/975,393, filed Sep. 26, 2007; and 60/978,188, filed Oct. 8, 2007, each of which are incorporated herein by reference in their entirety.

This application also claims the benefit of U.S. Provisional Application No. 60/975,062 entitled "Secondary Synchronization Signal Mapping" to Eko N. Onggosanusi and Anand G. Dabak filed on Sep. 25, 2007, which is incorporated herein by reference in its entirety.

This application further claims the benefit of U.S. Provisional Application No. 60/975,393 entitled "Secondary Synchronization Signal Mapping" to Eko N. Onggosanusi and Anand G. Dabak filed on Sep. 26, 2007, which is incorporated herein by reference in its entirety.

This application still further claims the benefit of U.S. Provisional Application No. 60/978,188 entitled "Secondary Synchronization Signal Mapping" to Eko N. Onggosanusi and Anand G. Dabak filed on Oct. 8, 2007, which is incorporated herein by reference in its entirety.

TECHNICAL FIELD

The present disclosure is directed, in general, to a communication system and, more specifically, to a transmitter, a receiver and methods of operating a transmitter or a receiver.

BACKGROUND

In a cellular network, such as one employing orthogonal frequency division multiple access (OFDMA), each cell employs a base station that communicates with user equipment, such as a cell phone, a laptop, or a PDA, that is actively located within its cell. When the user equipment is first turned on, it has to do an initial cell search in order to be connected to the cellular network. This involves a downlink synchronization process between the base station and the user equipment wherein the base station sends a synchronization signal to the user equipment.

During initial cell search, the user equipment establishes timing and frequency offset parameters. Timing involves knowing where to sample the start of the synchronization frame and associated symbols. Frequency offset involves determining the mismatch between the controlling oscillator at the base station and the local oscillator in the user equipment. As the moving user equipment approaches a cell boundary between two adjoining cells, it performs a neighboring cell search in preparation to handover its activation from the initial cell to the neighboring cell. During this time, it receives information from the two base stations. Improvements in the process of transitioning between adjoining cells would prove beneficial in the art.

SUMMARY

Embodiments of the present disclosure provide a transmitter, a receiver and methods of operating a transmitter or a receiver. In one embodiment, the transmitter is for use with a base station and includes a primary module configured to provide a primary synchronization signal. The transmitter also includes a secondary mapping module configured to provide a secondary synchronization signal derived from two sequences taken from a same set of N sequences and indexed by an index pair $(S_1, S_2)$ with $S_1$ and $S_2$ ranging from zero to N−1, wherein the index pair $(S_1, S_2)$ is contained in a mapped set of index pairs corresponding to the same set of N sequences that defines a cell identity group. Additionally, the transmitter further includes a transmit module configured to transmit the primary and secondary synchronization signals.

In another embodiment, the receiver is for use with user equipment and includes a receive module configured to receive primary and secondary synchronization signals. The receiver also includes a primary processing module configured to detect a partial cell identity from the primary synchronization signal. Additionally, the receiver further includes a secondary processing module configured to detect a cell identity group from the secondary synchronization signal that is derived from two sequences taken from a same set of N sequences and indexed by an index pair $(S_1, S_2)$ with $S_1$ and $S_2$ ranging from zero to N−1, wherein the index pair $(S_1, S_2)$ is contained in a mapped set of index pairs corresponding to the same set of N sequences.

In another aspect, the method of operating the transmitter is for use with a base station and includes providing a primary synchronization signal. The method also includes providing a secondary synchronization signal derived from two sequences taken from a same set of N sequences and indexed by an index pair $(S_1, S_2)$ with $S_1$ and $S_2$ ranging from zero to N−1, wherein the index pair $(S_1, S_2)$ is contained in a mapped set of index pairs corresponding to the same set of N sequences that defines a cell identity group. The method further includes transmitting the primary and secondary synchronization signals.

In yet another aspect, the method of operating the receiver is for use with user equipment and includes receiving primary and secondary synchronization signals. The method also includes detecting a partial cell identity from the primary synchronization signal. The method further includes defining a cell identity group from the secondary synchronization signal that is derived from two sequences taken from a same set of N sequences and indexed by an index pair $(S_1, S_2)$ with $S_1$ and $S_2$ ranging from zero to N−1, wherein the index pair $(S_1, S_2)$ is contained in a mapped set of index pairs corresponding to the same set of N sequences.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION OF THE DRAWINGS

For a more complete understanding of the present disclosure, reference is now made to the following descriptions taken in conjunction with the accompanying drawings, in which.

DETAILED DESCRIPTION

Figure 1:
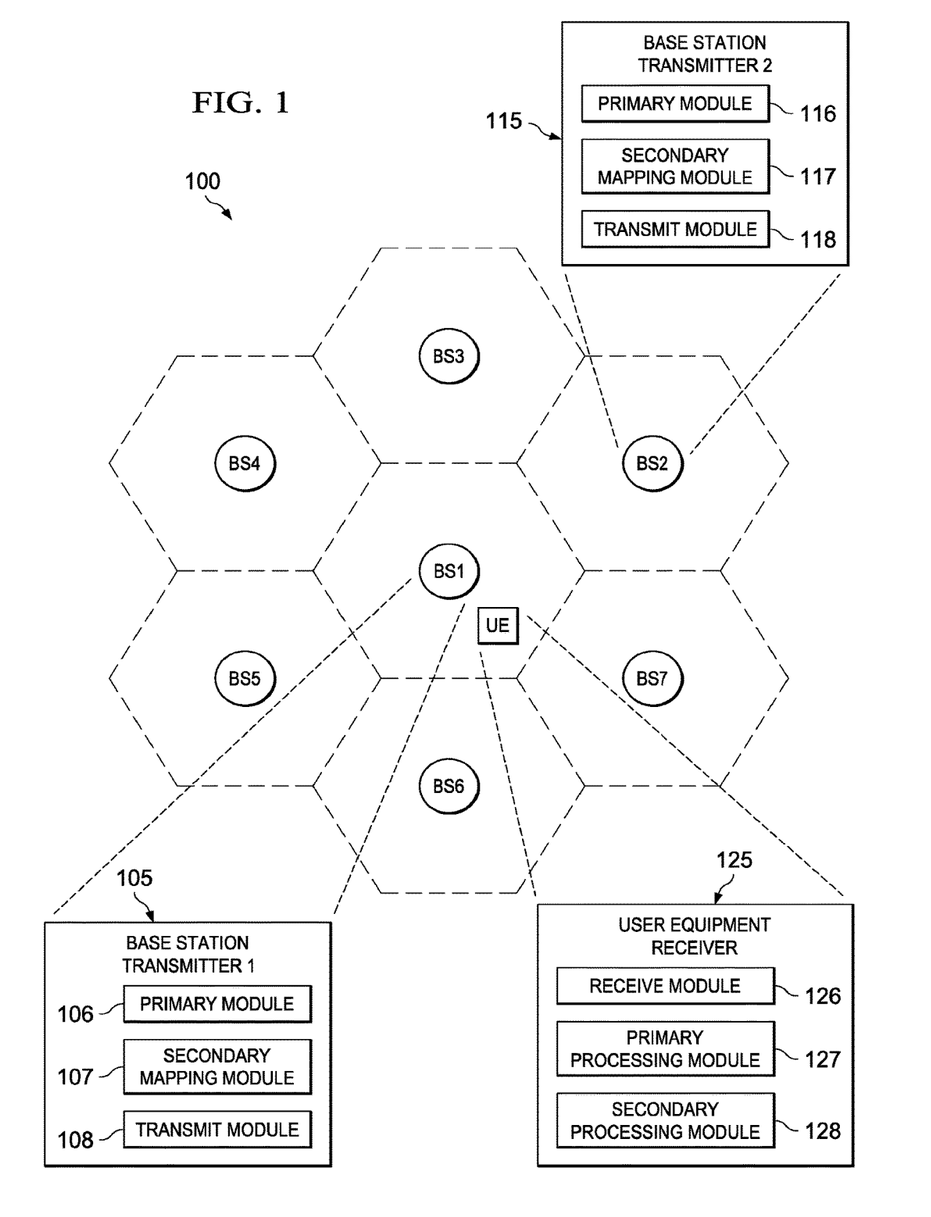
FIG. 1 illustrates an exemplary diagram of a cellular network employing embodiments a transmitter and a receiver constructed according to the principles of the present disclosure.

FIG. 1 illustrates an exemplary diagram of a cellular network 100 employing embodiments a transmitter and a receiver constructed according to the principles of the present disclosure. In the illustrated embodiment, the cellular network 100 is part of an OFDMA system and includes a cellular grid having a centric cell and six surrounding first-tier cells. The centric cell employs a centric base station BS1, and the surrounding first-tier cells employ first-tier base stations BS2-BS7, as shown.

The centric base station BS1 includes a first base station transmitter 105 and the first tier base station BS2 includes a second base station transmitter 115. User equipment (UE) is located on a cell boundary between the first and second base station transmitters 105, 115, as shown. The first base station transmitter 105 includes a primary module 106, a secondary mapping module 107 and a transmit module 108. The second base station transmitter 115 includes a primary module 116, a secondary mapping module 117 and a transmit module 118. The UE includes a UE receiver 125 having a receive module 126, a primary processing module 127 and a secondary processing module 128.

In the first and second base station transmitters 105, 115, the primary modules 106, 116 are configured to provide a primary synchronization signal. The secondary mapping modules 107, 117 are configured to provide a secondary synchronization signal derived from two sequences taken from a same set of N sequences and indexed by an index pair $(S_1, S_2)$ with $S_1$ and $S_2$ ranging from zero to N−1, wherein the index pair $(S_1, S_2)$ is contained in a mapped set of index pairs corresponding to the same set of N sequences that defines a cell identity group. The transmit modules 108, 118 are configured to transmit the primary and secondary synchronization signals.

In the UE receiver 125, the receive module 126 is configured receive primary and secondary synchronization signals. The primary processing module 127 is configured to detect a partial cell identity from the primary synchronization signal. The secondary processing module 128 is configured to detect a cell identity group from the secondary synchronization signal that is derived from two sequences taken from a same set of N sequences and indexed by an index pair $(S_1, S_2)$ with $S_1$ and $S_2$ ranging from zero to N−1, wherein the index pair $(S_1, S_2)$ is contained in a mapped set of index pairs corresponding to the same set of N sequences.

Figure 2A:
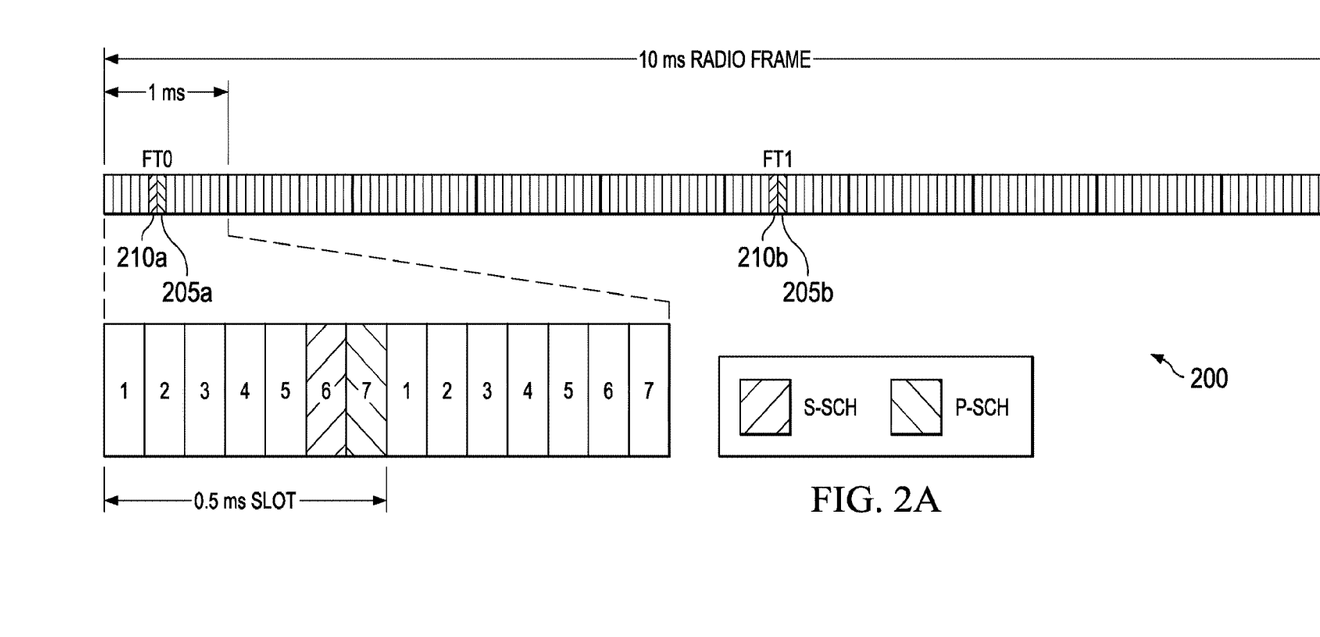
FIG. 2A illustrates a diagram of a downlink radio frame that includes a downlink synchronization signal constructed according to the principles of the present disclosure.

FIG. 2A illustrates a diagram of a downlink radio frame 200 that includes a downlink synchronization signal constructed according to the principles of the present disclosure. The downlink radio frame 200 includes two synchronization signals wherein each consists of a primary synchronization signal (PSS, also termed P-SCH) 205 and a secondary synchronization signal (SSS, also termed S-SCH) 210 that are located as shown. One PSS 205 and one SSS 210 symbol are transmitted every 5 ms epoch. Design of the synchronization signals to enable fast cell search (i.e., less than 100 ms) is required for long-term evolution (LTE) of 3GPP.

The underlying code for the PSS 205 is called a primary SYNC code (PSC). The PSC for each cell is chosen from three sequences and is tied to the cell identification (ID) within a certain group of cell IDs. Hence, one PSS symbol carries three cell ID hypotheses. The underlying code for the SSS 210 is called the secondary SYNC code (SSC). The SSS 210 carries cell-specific information. The following cell-specific information may be carried in one SSS symbol.

As an example, a total of 510 cell IDs are to be supported. Since three cell ID hypotheses are carried in the PSS 205, 170 cell ID groups (170 hypotheses) are provided. Additionally, since there are two SSS 210 symbols per radio frame 200, a radio framing timing indicator (FT0 or FT1) is also provided. In the illustrated embodiments of the present disclosure, two-segment SSC designs may be employed. That is, two groups of M-sequences with half-length (31) are used to construct a large number of composite sequences. Additionally, the two sequences are interleaved.

The two-segment SSC design inherits problems of ambiguity and collision in relation to a neighboring cell search. For the case of ambiguity, multiple M-sequences are detected for each of the two SSC segments during the neighboring cell search. For example, if two M-sequences are detected for each segment, there are a total of four possibilities where some may not be valid. Hence, ambiguity occurs when both the SSC segments corresponding to the two adjacent cells differ. In general, if $n_1$ and $n_2$ M-sequences are detected for segments one and two, there are a total of $n_1 \times n_2$ possibilities (although there are only $\max(n_1, n_2)$ distinct cell IDs). For the case of collision, one (and only one) of the SSC segments is identical for several SSC sequences. Essentially, this amounts to higher pair-wise cross-correlation across the SSC sequences.

Figure 2B:
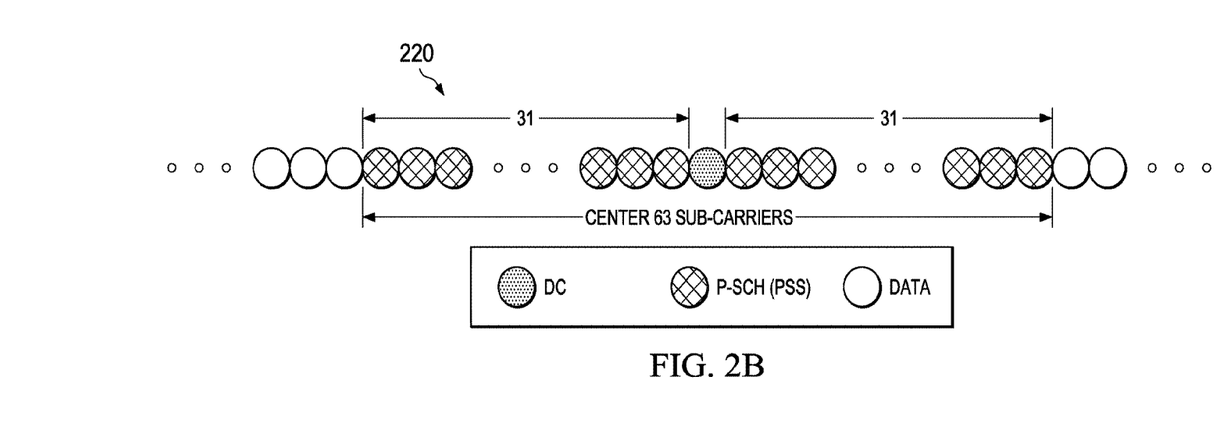
FIG. 2B illustrates an embodiment of a primary synchronization signal constructed according to the principles of the present disclosure.

FIG. 2B illustrates an embodiment of a primary synchronization signal 220 constructed according to the principles of the present disclosure. FIG. 2B shows a mapping in the frequency domain of a PSS corresponding to the primary synchronization signal (PSS) 220 that occupies a center 63 sub-carriers, as shown. The mapping also includes a DC sub-carrier and the data sub-carriers. This mapping assumes that there are 31 sub-carriers to both the left and right of the DC sub-carrier.

Since coherent SSS detection offers better performance than non-coherent detection in most scenarios, the PSS and SSS designs accommodate accurate coherent SSS detection. Additionally, since the PSS is used as a phase reference (to provide channel estimates) for decoding the SSS (demodulating the SSS), the SSS occupies exactly the same set of sub-carriers as the PSS in the illustrated embodiment.

Figure 2C:
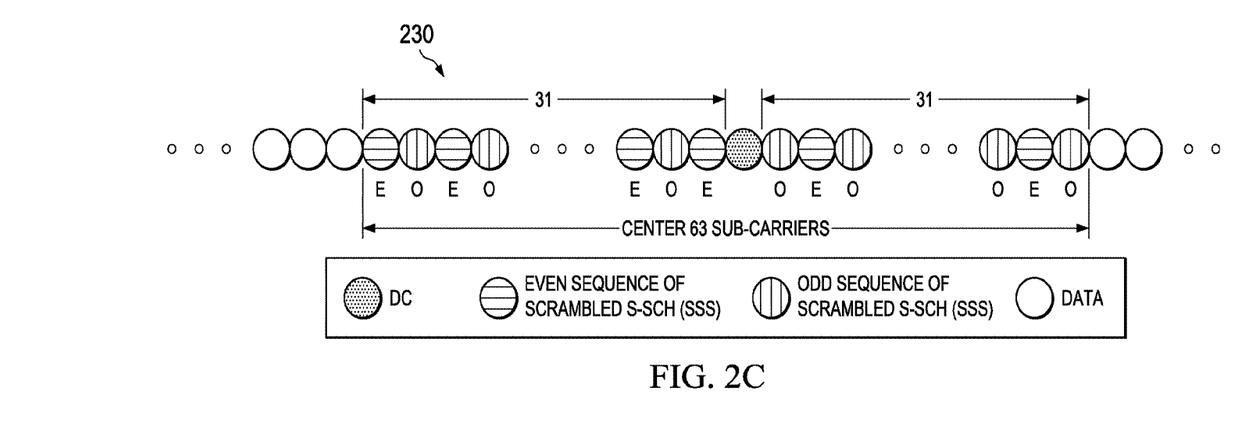
FIG. 2C illustrates an embodiment of a scrambled secondary synchronization signal mapping based on employing two segments and constructed according to the principles of the present disclosure.

FIG. 2C illustrates an embodiment of a scrambled secondary synchronization signal (SSS) mapping 230 based on employing two segments and constructed according to the principles of the present disclosure. The SSS mapping 230 occupies the center 63 sub-carriers as discussed with respect to FIG. 2B. The mapping includes the DC sub-carrier 301 and data sub-carriers, as before. Here, the mapping shows an interleaving of sub-carriers representing even and odd scrambled sequences of a two-segment, interleaved SSS.

In this case, the underlying SSS is of length-31 (two length-31 sequences interleaved in the frequency domain). Several natural candidates are M-sequences (pseudo noise (PN) sequences), Gold sequences, and truncated Walsh sequences. With Walsh sequences, the underlying length is 32, with one sample truncated. Other designs are also possible.

Figure 2D:
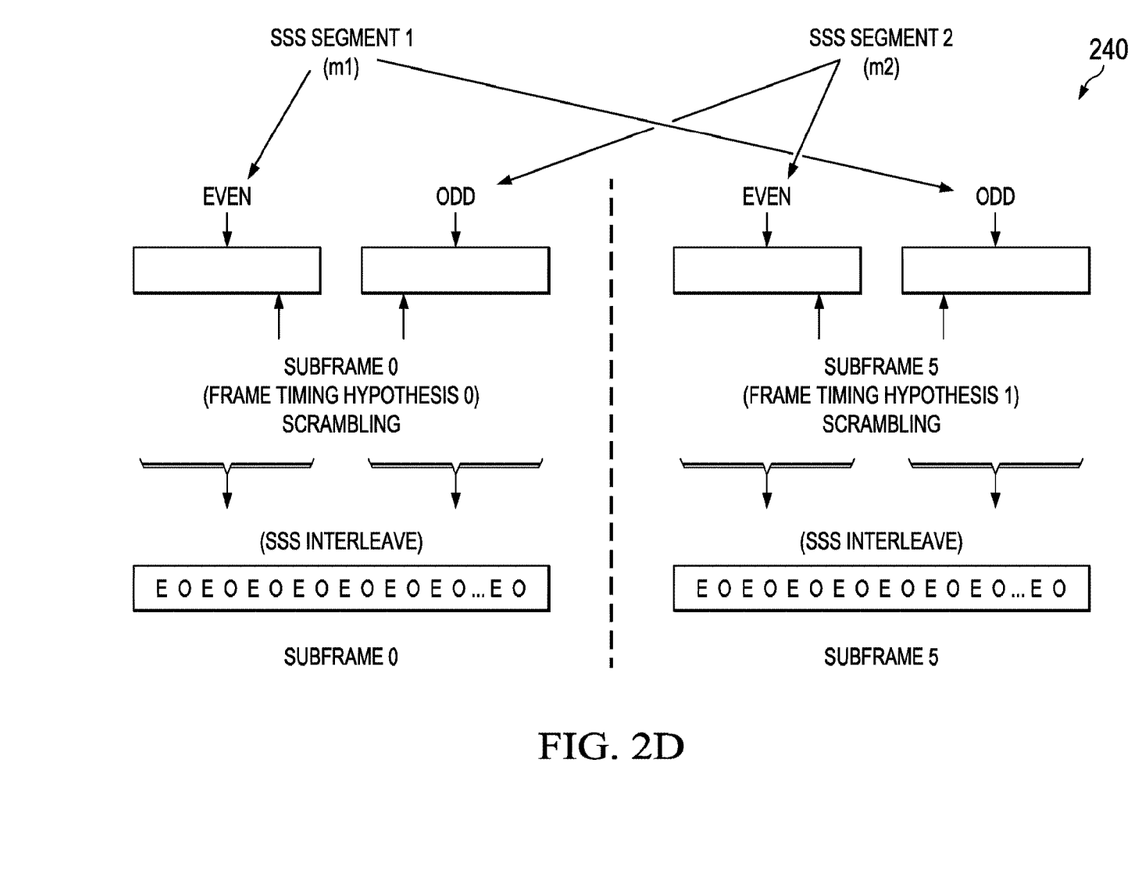
FIG. 2D illustrates a diagram of an embodiment of secondary synchronization sequence scrambling constructed according to the principles of the present disclosure.

FIG. 2D illustrates a diagram 240 of a construction of the secondary synchronization signal. The diagram 240 includes first and second SSS segments as may be employed in subframes 0 and 5 of FIG. 2A above (indicated by m1 and m2, respectively). In subframe 0 (which corresponds to frame timing hypothesis 0), the first SSS segment is provided as an even sequence, and in subframe 5 (which corresponds to frame timing hypothesis 1), it is provided as an odd sequence, as shown. Correspondingly, in subframe 5, the second SSS segment is provided as an even sequence, and in subframe 0, it is provided as an odd sequence, as shown. This action causes the swapping of the two SSS sequences in subframes 0 and 5. Each of the even and odd sequences is initially scrambled where the scrambling may be the same or different for subframe 0 and 5. The resulting even and odd scrambled sequences are interleaved as shown in FIG. 2C.

Figure 3:
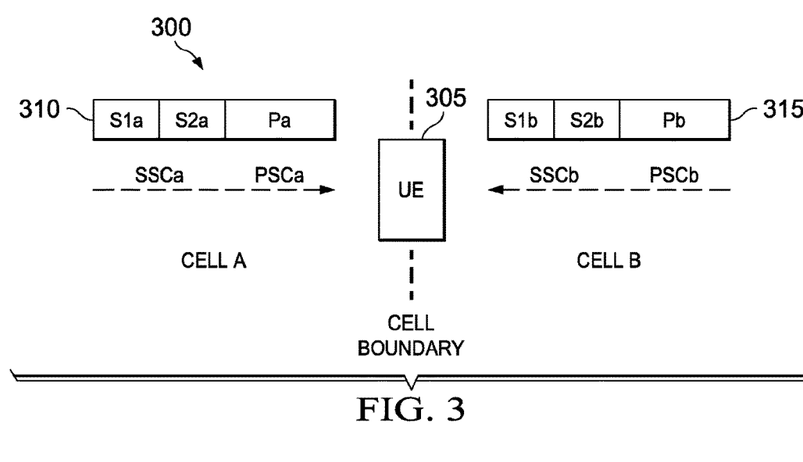
FIG. 3 illustrates a diagram corresponding to an embodiment of a neighboring cell search as may be employed by user equipment such as the user equipment discussed with respect to FIG. 1.

FIG. 3 illustrates a diagram corresponding to an embodiment of a neighboring cell search 300 as may be employed by user equipment such as the user equipment discussed with respect to FIG. 1. The diagram of the neighboring cell search 300 includes user equipment 305 and first and second synchronization signals 310, 315.

The ambiguity problem is clearly more detrimental since a wrong cell ID is detected 33 percent of the time. To illustrate the problems more clearly, different combinations of PSC, SSC1 (segment 1), and SSC2 (segment 2) are first identified. Assume a neighboring cell search scenario in a synchronous network with two cell IDs associated with (PSC, SSC1, SSC2) equal to (Pa, S1a, S2a) and (Pb, S1b, S2b). There are eight possible scenarios, as may be seen in Table 1 below.

TABLE 1

Eight Scenarios for the PSC, SS1 and SSC2 Triplet

| Scenario | Pa & Pb | S1a & S1b | S2a & S2b | Problem |
| --- | --- | --- | --- | --- |
| 1 | Same | Same | Same | n/a |
| 2 | Same | Same | Different | Collision |
| 3 | Same | Different | Same | Collision |
| 4 | Same | Different | Different | Ambiguity |
| 5 | Different | Same | Same | — |
| 6 | Different | Same | Different | Collision |
| 7 | Different | Different | Same | Collision |
| 8 | Different | Different | Different | Ambiguity |

By further analyzing Table 1 above and employing appropriate definitions, the following conclusions may be formed.

1. When a collision occurs (when only one segment is the same), ambiguity does not occur since ambiguity requires the two segments to be different. The converse also holds. Hence, collision and ambiguity are two disjoint problems).
2. Phase mismatch occurs whenever the channel seen by the PSC is significantly different from that seen by at least one segment of the SSC. Here, phase mismatch is defined in the context of the two cells IDs in the neighboring cells.
3. Other than the increase in phase mismatch, collision in the SSC design results in a lower minimum distance for the overall SSC.
4. To avoid a particular ambiguity, the other two cross combinations are not valid. This is, if the two SSCs are {X1,X2} and (Y1,Y2) with X1≠Y1 and X2≠Y2, the cross combinations (X1,Y2) and (X2,Y1) are not allowed to be valid SSCs codes. To fully avoid ambiguity and collision, there must be a one-to-one correspondence between segment one and segment two of the SSC.
5. Scenario 1 can happen due to a poor or incidental cell ID assignment for which there is nothing to be done. Scenarios 2, 3, and 4 are typically second-tier interference at best assuming a reasonable cell ID assignment. Scenarios 5, 6, 7, and 8 correspond to first-tier interference and hence are the most relevant scenarios.

Figure 4:
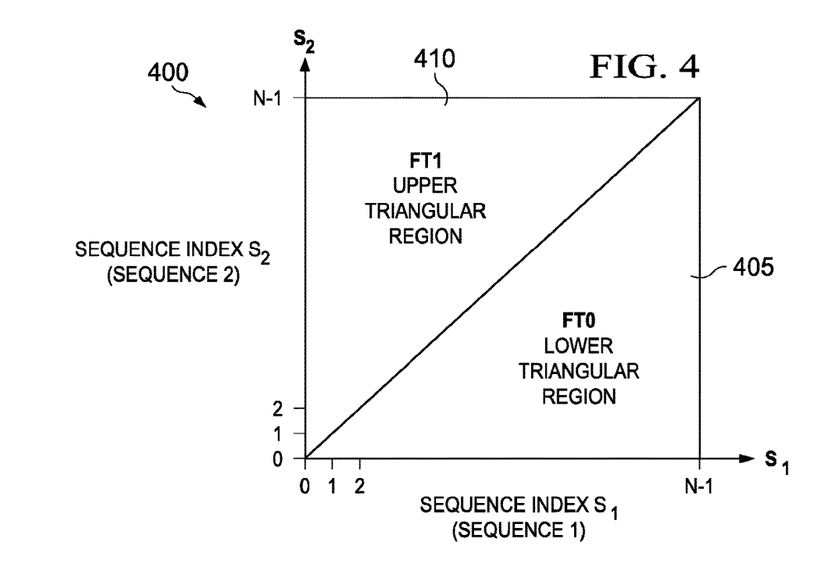
FIG. 4 illustrates an embodiment of a segment plane constructed according to the principles of the present disclosure.

FIG. 4 illustrates an embodiment of a segment plane 400 constructed according to the principles of the present disclosure. The illustrated segment plane 400 includes lower and upper triangular regions 405, 410 corresponding to first and second radio framing timing indicators FT0, FT1. While the region for $(S_1,S_2)$ is illustrated as a plane, the valid points only include the combinations where $S_1$ and $S_2$ are integer between 0 and N−1.

Embodiments of this disclosure provide mapping strategies that minimize both collision and ambiguity events. Assuming a total of N available M-sequences per segment, the x-axis and y-axis represent a sequence index $S_1$ and $S_2$ for segments 1 and 2, respectively. The upper triangular region 410 is defined as follows: $\{(S_1,S_2):S_2 \geq S_1, S_1 \in \{0, 1, \ldots, N-1\}\}$.

The following observations and design principles may be inferred from FIG. 4.

1. Ambiguity events can be reduced significantly when a rectangle mapping region is avoided for a given radio frame timing hypothesis, since a rectangular mapping ensures the worst ambiguity condition. For example, if the two SSC mappings are {X1,X2} and (Y1,Y2) with X1≠Y1 and X2≠Y2, both of the two cross combinations (X1,Y2) and (X2,Y1) are a valid SSC mapping.
2. The number of collision and ambiguity events can be minimized when all the possible (S1,S2) pairs occupy a region parallel to the diagonal line of S1=S2 with minimum region width for a given radio frame timing. This ensures that minimum cross-over with the horizontal and vertical lines. The principle is analogous to minimizing the time-bandwidth product of the chirp waveform in the time-frequency plane. A mapping region as close as possible to the diagonal line of S1=S2 ensures a minimum region width. This occurs because the area of the mapping region is maximized.

3. With swapped mapping, the mapping only occupies the upper or lower triangular region of the segment plane 400 for a given radio frame timing hypothesis 4. The design principles in 1, 2, or 3 above can be combined with other mapping strategies such as the simple or swapped mapping. With swapped mapping, both the lower and upper triangular regions 405, 410 are utilized. That is, the mapping set is partitioned into two parts which are mirror image with respect to the S1=S2 line. In fact, the combination of swapped mapping (principle 3) with the diagonal mapping (principle 2) ensures the minimum region width for a given radio frame timing.

FIGS. 5A, 5B, 5C and 5D illustrate embodiments of mapping schemes for first and second segments of the SSS constructed according to the principles of the present disclosure. The examples discussed with respect to FIGS. 5A, 5B, 5C and 5D employ the general structure of FIG. 4.

Two radio frame timing hypotheses (FT0 and FT1) and 170 cell group IDs are assumed. This yields a total of 340 hypotheses. Note that these numbers are used only for illustrative purposes. For example, the current disclosure also includes a scenario having a different number of cell identity groups (e.g., 168 cell identity groups). Additionally, N=31 is also assumed.

Figure 5A:
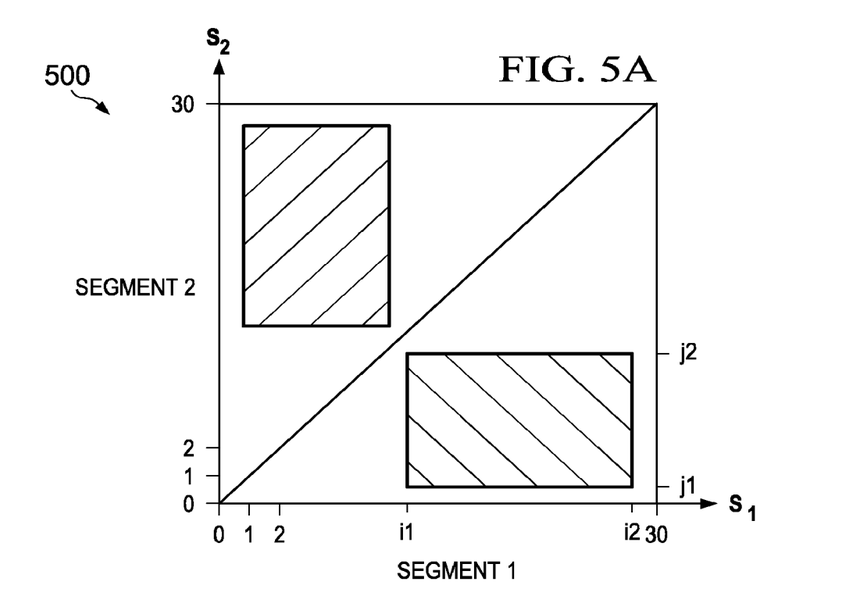
FIGS. 5A, 5B, 5C and 5D illustrate embodiments of mapping schemes for first and second segments of the S-SCH constructed according to the principles of the present disclosure.

FIG. 5A depicts a proposed mapping scheme in combination with swapped mapping strategies. In this case, i1,i2, j1,j2 should be chosen such that $(i2-i1+1) \times (j2-j1+1) \geq 170$. Then, a subset of the size-170 can be chosen for each of the two rectangular regions. Each of the two rectangular regions represents one of the two frame timing hypotheses FT0, FT1. The two regions are mirror images of each other with respect to the S1=S2 diagonal line. This mapping scheme, however, results in a poor number of ambiguity events. It may be noted that instead of occupying a rectangular region, any arbitrary shape (e.g., triangular or even circular) can also be used. The rectangular region is only for illustrative purposes.

Figure 5B:
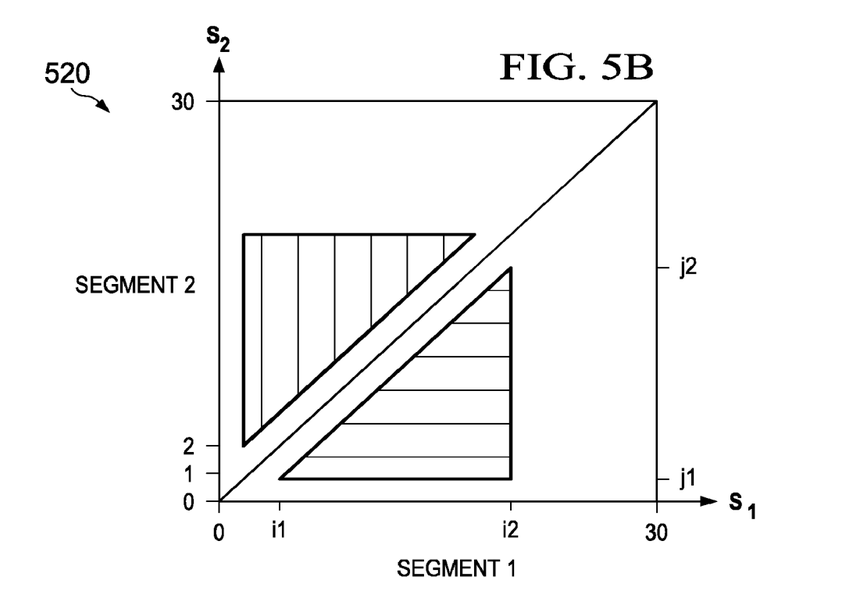

FIG. 5B depicts a mapping scheme with a triangular mapping region. In this case, i1,i2,j1,j2 may be chosen such that $$\frac{(i2-i1+1) \times (j2-j1+1)}{2} \geq 170.$$

It may be noted that the embodiments in FIGS. 5A and 5B do not necessarily follow the second design principle, which will be reflected in FIGS. 5C and 5D below. Note also that i1,i2,j1,j2 can take any value from 0, 1, . . . , 30.

Figure 5C:
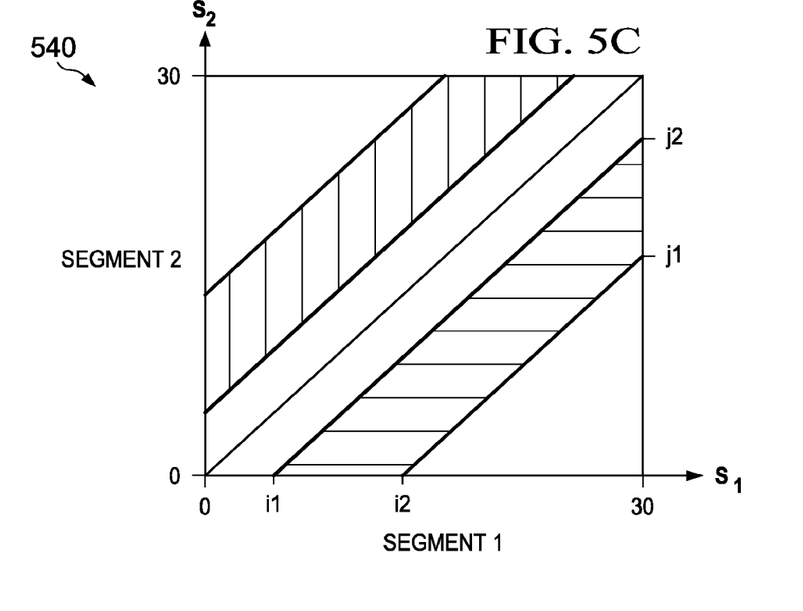
Figure 5D:
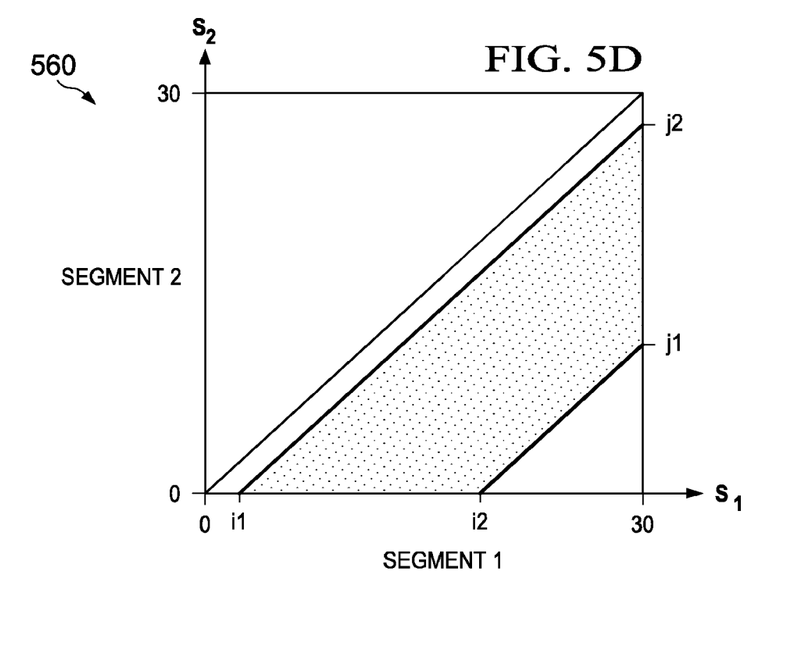

FIGS. 5C and 5D depict two embodiments that adhere to the second design principle, which minimizes the number of collision and ambiguity events. FIG. 5C employs swapped mapping, which is unlike FIG. 5D. For FIG. 5C, i1,i2,j1,j2 is chosen such that $$(31-i2-i1) \times (i2-i1) + \frac{(i2-i1) \times (i2-i1+1)}{2} \geq 170.$$

Then, a subset of size-170 can be chosen for each of the two strip regions. In this case, a swapped mapping relationship between two SSC hypotheses with the same cell ID group holds. For frame timing FT0, (X1,X2) represents the same cell ID group as (X2,X1) for frame timing FT1.

For the example of FIG. 5C, i1,i2,j1,j2 is chosen such that $$(31-i2-i1) \times (i2-i1) + \frac{(i2-i1) \times (i2-i1+1)}{2} \geq 340.$$

Then, a subset of size-240 can be chosen for each of the two strip regions. In the example of FIG. 5d, a particular relation for frame timing FT0 and FT1 corresponding to the same cell ID group is not established. While FIG. 5D depicts only a lower triangular mapping region, the same principles may be applied for only an upper triangular mapping region.

Note that i1,i2,j1,j2(j1 and j2 are directly related by i2 and i1, respectively) can take any value from 0, 1, . . . , 30 although i1=0 is not preferred for FIG. 5C due to the overlap in the mapping for the two different frame timing instances. To minimize the width of the mapping region (principle 2), i1=1 is the best choice for both examples of FIGS. 5C and 5D. Intuitively, the example of FIG. 5C results in a reduced number of collision and ambiguity events compared to the other examples of FIGS. 5A, 5B and 5D.

A final choice of mapping may consider the SSC distance property after SSC-based scrambling is applied (scrambling of segment 2 as a function of segment 1). Note that when an M-sequence based SSC is used (all the SSCs are derived from one generator polynomial), the set of scrambling codes for segment 2 is taken from the same set of codes as segment 1. This is because the resulting set of segment 2 sequences has the maximum set cardinality of 32. Of course, other variations and combinations of the above design principles are possible.

In the above examples, it is assumed that the number of cell ID groups is 170. An extension (or subset) can be used if a larger (or smaller) number of cell ID groups is desired. For instance, if the number of cell ID groups is 168 (the one used for LTE), a subset can be used.

Below are two swapped diagonal mapping examples (a first example corresponding to Tables 2 and 3 and a second example corresponding to Table 4) along with formulas to generate the code-sequence index for segment 1 and segment 2. The mapping/pairing (S1,S2) is defined for the one frame timing hypothesis. The pairing for the other frame timing hypothesis is then (S2,S1). An extension (or subset) can be used if a larger (or smaller) number of cell-ID-groups is desired. For example, if the number of cell ID groups is 168, the last elements (corresponding to GID=168 and 169 can be discarded).

TABLE 2

| Example 1 | | |
|---|---|---|
| GID | S1 | S2 |
| 0 | 0 | 1 |
| 1 | 0 | 2 |
| 2 | 0 | 3 |
| 3 | 0 | 4 |
| 4 | 0 | 5 |
| 5 | 0 | 6 |
| 6 | 1 | 2 |
| 7 | 1 | 3 |
| 8 | 1 | 4 |
| 9 | 1 | 5 |
| 10 | 1 | 6 |
| 11 | 1 | 7 |
| 12 | 2 | 3 |

TABLE 2-continued

Example 1

| GID | S1 | S2 |
| --- | --- | --- |
| 13 | 2 | 4 |
| 14 | 2 | 5 |
| 15 | 2 | 6 |
| 16 | 2 | 7 |
| 17 | 2 | 8 |
| 18 | 3 | 4 |
| 19 | 3 | 5 |
| 20 | 3 | 6 |
| 21 | 3 | 7 |
| 22 | 3 | 8 |
| 23 | 3 | 9 |
| 24 | 4 | 5 |
| 25 | 4 | 6 |
| 26 | 4 | 7 |
| 27 | 4 | 8 |
| 28 | 4 | 9 |
| 29 | 4 | 10 |
| 30 | 5 | 6 |
| 31 | 5 | 7 |
| 32 | 5 | 8 |
| 33 | 5 | 9 |
| 34 | 5 | 10 |
| 35 | 5 | 11 |
| 36 | 6 | 7 |
| 37 | 6 | 8 |
| 38 | 6 | 9 |
| 39 | 6 | 10 |
| 40 | 6 | 11 |
| 41 | 6 | 12 |
| 42 | 7 | 8 |
| 43 | 7 | 9 |
| 44 | 7 | 10 |
| 45 | 7 | 11 |
| 46 | 7 | 12 |
| 47 | 7 | 13 |
| 48 | 8 | 9 |
| 49 | 8 | 10 |
| 50 | 8 | 11 |
| 51 | 8 | 12 |
| 52 | 8 | 13 |
| 53 | 8 | 14 |
| 54 | 9 | 10 |
| 55 | 9 | 11 |
| 56 | 9 | 12 |
| 57 | 9 | 13 |
| 58 | 9 | 14 |
| 59 | 9 | 15 |
| 60 | 10 | 11 |
| 61 | 10 | 12 |
| 62 | 10 | 13 |
| 63 | 10 | 14 |
| 64 | 10 | 15 |
| 65 | 10 | 16 |
| 66 | 11 | 12 |
| 67 | 11 | 13 |
| 68 | 11 | 14 |
| 69 | 11 | 15 |
| 70 | 11 | 16 |
| 71 | 11 | 17 |
| 72 | 12 | 13 |
| 73 | 12 | 14 |
| 74 | 12 | 15 |
| 75 | 12 | 16 |
| 76 | 12 | 17 |
| 77 | 12 | 18 |
| 78 | 13 | 14 |
| 79 | 13 | 15 |
| 80 | 13 | 16 |
| 81 | 13 | 17 |
| 82 | 13 | 18 |
| 83 | 13 | 19 |
| 84 | 14 | 15 |
| 85 | 14 | 16 |
| 86 | 14 | 17 |
| 87 | 14 | 18 |
| 88 | 14 | 19 |
| 89 | 14 | 20 |
| 90 | 15 | 16 |
| 91 | 15 | 17 |
| 92 | 15 | 18 |
| 93 | 15 | 19 |
| 94 | 15 | 20 |
| 95 | 15 | 21 |
| 96 | 16 | 17 |
| 97 | 16 | 18 |
| 98 | 16 | 19 |
| 99 | 16 | 20 |
| 100 | 16 | 21 |
| 101 | 16 | 22 |
| 102 | 17 | 18 |
| 103 | 17 | 19 |
| 104 | 17 | 20 |
| 105 | 17 | 21 |
| 106 | 17 | 22 |
| 107 | 17 | 23 |
| 108 | 18 | 19 |
| 109 | 18 | 20 |
| 110 | 18 | 21 |
| 111 | 18 | 22 |
| 112 | 18 | 23 |
| 113 | 18 | 24 |
| 114 | 19 | 20 |
| 115 | 19 | 21 |
| 116 | 19 | 22 |
| 117 | 19 | 23 |
| 118 | 19 | 24 |
| 119 | 19 | 25 |
| 120 | 20 | 21 |
| 121 | 20 | 22 |
| 122 | 20 | 23 |
| 123 | 20 | 24 |
| 124 | 20 | 25 |
| 125 | 20 | 26 |
| 126 | 21 | 22 |
| 127 | 21 | 23 |
| 128 | 21 | 24 |
| 129 | 21 | 25 |
| 130 | 21 | 26 |
| 131 | 21 | 27 |
| 132 | 22 | 23 |
| 133 | 22 | 24 |
| 134 | 22 | 25 |
| 135 | 22 | 26 |
| 136 | 22 | 27 |
| 137 | 22 | 28 |
| 138 | 23 | 24 |
| 139 | 23 | 25 |
| 140 | 23 | 26 |
| 141 | 23 | 27 |
| 142 | 23 | 28 |
| 143 | 23 | 29 |
| 144 | 24 | 25 |
| 145 | 24 | 26 |
| 146 | 24 | 27 |
| 147 | 24 | 28 |
| 148 | 24 | 29 |
| 149 | 24 | 30 |
| 150 | 25 | 26 |
| 151 | 25 | 27 |
| 152 | 25 | 28 |
| 153 | 25 | 29 |
| 154 | 25 | 30 |
| 155 | 26 | 27 |
| 156 | 26 | 28 |
| 157 | 26 | 29 |
| 158 | 26 | 30 |
| 159 | 27 | 28 |
| 160 | 27 | 29 |
| 161 | 27 | 30 |
| 162 | 28 | 29 |
| 163 | 28 | 30 |
| 164 | 29 | 30 |

TABLE 2-continued

Example 1

| GID | S1 | S2 |
|---|---|---|
| 165 | 0 | 7 |
| 166 | 1 | 8 |
| 167 | 2 | 9 |
| 168 | 3 | 10 |
| 169 | 4 | 11 | n=GID
Define
$\eta = \text{round}\,(\sqrt{2\times(165-n)})$
Then the mapping is defined as:

TABLE 3

Example 1

| n | $S_1(n)$ | $S_2(n)$ |
|---|---|---|
| 0, 1, ..., 149 | $\dfrac{n}{6}$ | $S_1(n) + \text{mod}(n,6) + 1$ |
| 150, 151, ..., 164 | $30 - \eta$ | $S_1(n) + \text{mod}(n+1,\eta) + 1, \eta = 4$ |
|  |  | $S_1(n) + \text{mod}(n,\eta) + 1, \eta \neq 4$ |
| 165, 166, ..., 169 | $n - 165$ | $S_1(n) + 7$ |

TABLE 4

Example 2

| GID | S1 | S2 |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |

TABLE 4-continued

Example 2

| GID | S1 | S2 |
|-----|----|----|
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| 168 | 3 | 10 |
| 169 | 4 | 11 | n=GID
Define $$\eta = \text{round}\left(\sqrt{2 \times (465 - n)}\right)$$

$$\theta = \frac{(29 - \eta)(30 - \eta)}{2}$$

Then the mapping is defined as $$S_1(n) = \text{mod}(n - \theta, \eta + 1)$$

$$S_2(n) = \text{mod}\left(S_1(n) + \left\lfloor \frac{n - \theta}{\eta + 1} \right\rfloor + 1, 31\right)$$

Figure 6:
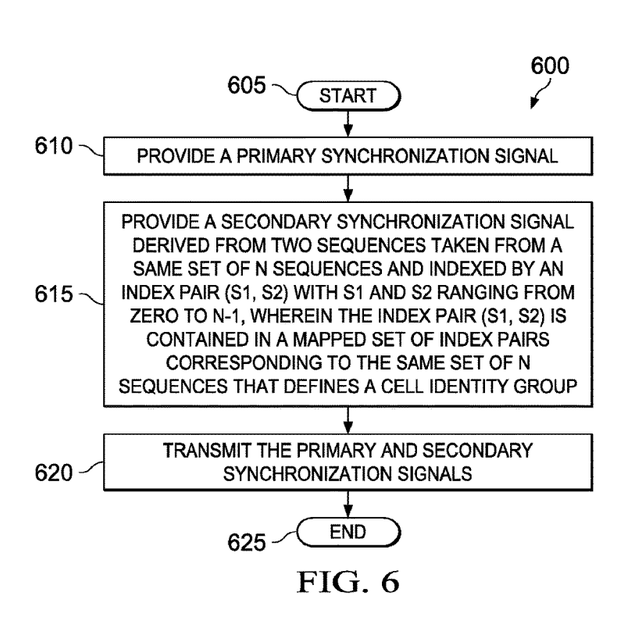
FIG. 6 illustrates a flow diagram of an embodiment of a method of operating a transmitter carried out in accordance with the principles of the present disclosure.

FIG. 6 illustrates a flow diagram of an embodiment of a method of operating a transmitter 600 carried out in accordance with the principles of the present disclosure. The method 600 is for use with a base station and starts in a step 605. Then, in a step 610, a primary synchronization signal is provided. A secondary synchronization signal is provided that is derived from two sequences taken from a same set of N sequences and indexed by an index pair ($S_1$, $S_2$) with $S_1$ and $S_2$ ranging from zero to N−1, wherein the index pair ($S_1$, $S_2$) is contained in a mapped set of index pairs corresponding to the same set of N sequences that defines a cell identity group, in a step 615.

In one embodiment, a first and second frame timing value corresponds to an index pair condition of $S_1>S_2$ and $S_2>S_1$, respectively. In another embodiment, a first and second frame timing value corresponds to an index pair condition of $S_2>S_1$ and $S_1>S_2$, respectively.

In one embodiment, index pair conditions $S_2>S_1$ and $S_2-S_1$ are restricted throughout possible integer values by a selected usage of all N sequences, for a given frame timing value. The indices $S_1$ and $S_2$ represent two different cyclic shifts of the same M-sequence. Additionally, the number of cell identity groups is 168, N is 31, and the index pair condition $S_2-S_1$ ranges from one to seven. Also, index pair conditions ($S_1$,$S_2$)=($m_1$,$m_2$) and ($S_1$,$S_2$) ($m_2$,$m_1$) represent a same cell identity group for two different frame timing values. The primary and secondary synchronization signals are transmitted in a step 620, and the method 600 ends in a step 625.

Figure 7:
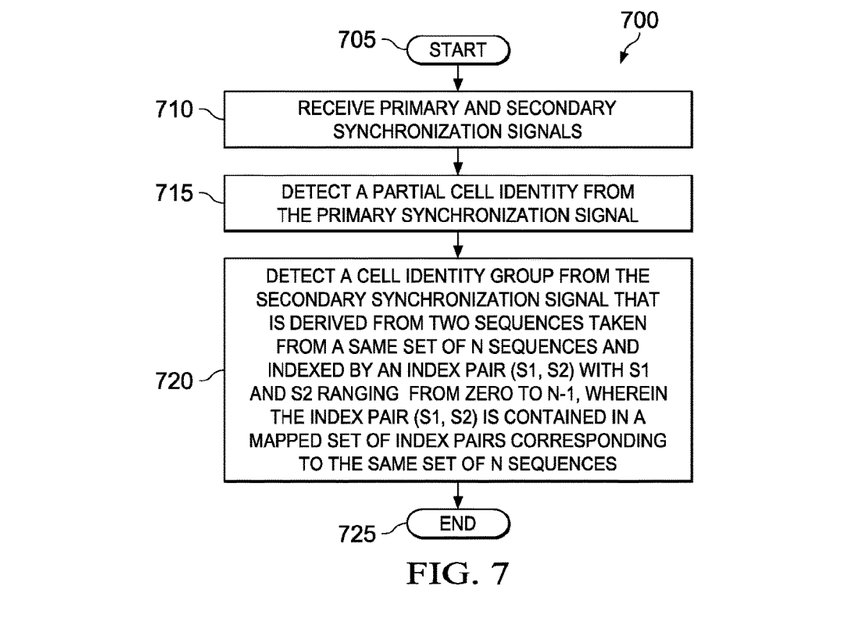
FIG. 7 illustrates a flow diagram of an embodiment of a method of operating a receiver carried out in accordance with the principles of the present disclosure.

FIG. 7 illustrates a flow diagram of an embodiment of a method of operating a receiver 700 carried out in accordance with the principles of the present disclosure. The method 700 is for use with user equipment and starts in a step 705. Then, in a step 710, primary and secondary synchronization signals are received. A partial cell identity from the primary synchronization signal in a step 715. A cell identity group is defined from the secondary synchronization signal that is derived from two sequences taken from a same set of N sequences and indexed by an index pair ($S_1$, $S_2$) with $S_1$ and $S_2$ ranging from zero to N−1, wherein the index pair ($S_1$, $S_2$) is contained in a mapped set of index pairs corresponding to the same set of N sequences, in a step 720.

In one embodiment, a first and second frame timing value corresponds to an index pair condition of $S_1>S_2$ and $S_2>S_1$, respectively. In another embodiment, a first and second frame timing value corresponds to an index pair condition of $S_2>S_1$ and $S_1>S_2$, respectively.

In one embodiment, index pair conditions $S_2>S_1$ and $S_2-S_1$ are restricted throughout possible integer values by a selected usage of all N sequences, for a given frame timing value. The indices $S_1$ and $S_2$ represent two different cyclic shifts of the same M-sequence. Additionally, the number of cell identity groups is 168, N is 31, and the index pair condition $S_2-S_1$ ranges from one to seven. Also, index pair conditions ($S_1$,$S_2$)=(($m_1$,$m_2$) and ($S_1$,$S_2$)=($m_2$,$m_1$) represent a same cell identity group for two different frame timing values. The method 700 ends in a step 725.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which the disclosure relates will appreciate that other and further additions, deletions, substitutions and modifications may be made to the described example embodiments without departing from the the disclosure.

What is claimed is:

1. An apparatus of a user equipment (UE), the apparatus comprising:
    processing circuitry, the processing circuitry configured to:
        decode a primary synchronization signal (PSS) to obtain physical layer identity, the PSS received from an evolved Node-B (eNB);
        decode a secondary synchronization signal (SSS) to obtain a physical-layer cell-identity group from two sequences, wherein the physical-layer cell-identity group is an integer, each of the two sequences taken from a set of N sequences indexed by an index pair;
        determine a physical-layer cell identity (PCI) based on the physical layer identity and the physical-layer cell-identity group; and
        perform time and frequency synchronization with a cell of the eNB based on the PSS and the SSS; and
    memory, the memory coupled to the processing circuitry and configured to store the PCI.

2. The apparatus of claim 1, wherein the SSS is a 62-bit sequence comprising an interleaved concatenation of two length-31 sequences.

3. The apparatus of claim 2, wherein each of the length-31 sequences includes the two sequences, wherein each of the two sequences appears at a different even or odd position within the two length-31 sequences respectively.

4. The apparatus of claim 1, wherein each index in the index pair ranges from 0 to N−1, and wherein N is an integer such that 0≤N≤30.

5. The apparatus of claim 1, wherein the physical-layer cell-identity group (PUG) is an integer such that 0≤PCIG≤167.

6. The apparatus of claim 1, wherein the two sequences represent two different cyclic shifts of the same M-sequence.

7. The apparatus of claim 1, wherein the physical-layer cell-identity group (PCIG) and the index pair ($ind_0$, $ind_1$) are mapped according to the following mapping:

| PCIG | $ind_0$ | $ind_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |

-continued

| PCIG | $ind_0$ | $ind_1$ |
| --- | --- | --- |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |

8. The apparatus of claim 1, wherein the PSS and the SSS are received within slot 0 and slot 10 of a downlink frame, and wherein the processing circuitry refrains from decoding PSS and SSS signalling within remaining slots of the frame.

9. The apparatus of claim 8, wherein the PSS has a fixed position at the last OFDM symbol in slots 0 and 10 of the downlink frame.

10. The apparatus of claim 8, wherein the downlink frame includes 10 subframes having positions in the frame that are identified as subframes 0 to 9, and wherein the processing circuitry is to configure the UTE to receive the PSS only in non-empty subframes having predetermined positions identified as subframes 0 and 5.

11. The apparatus of claim 10, wherein a subframe comprises fourteen symbols identified as symbols #0 to #13, and the PSS has a fixed position at symbol #6 in subframes 0 and 5, and the SSS has a fixed position at symbol #5 in subframes 0 and 5.

12. The apparatus of claim 1, further comprising:
one or more antennas; and
transceiver circuitry coupled to the processing circuitry and the one or more antennas, and configured to receive the PSS and the SSS.

13. An apparatus of an Evolved Node-B (eNB), the apparatus comprising:
processing circuitry, the processing circuitry configured to:
generate a primary synchronization signal (PSS) to include a physical layer identity;
generate a secondary synchronization signal (SSS) to include a physical-layer cell-identity group using two sequences, wherein the physical-layer cell-identity group is an integer, each of the two sequences taken from a set of N sequences indexed by an index pair, wherein each index in the index pair ranges from 0 to N−1; and
encode one or more downlink subframes for transmission to a user equipment (UE) to include the PSS and the SSS at fixed positions of the subframes; and
memory, the memory coupled to the processing circuitry and configured to store the set of N sequences.

14. The apparatus of claim 13, wherein the SSS is a 62-bit sequence comprising an interleaved concatenation of two length-31 sequences.

15. The apparatus of claim 14, wherein each of the length-31 sequences includes the two sequences, wherein each of the two sequences appears at a different even or odd position within the two length-31 sequences respectively.

16. The apparatus of claim 13, wherein each index in the index pair ranges from 0 to N−1, and wherein N is an integer such that $0 \leq N \leq 30$.

17. The apparatus of claim 13, wherein the physical-layer cell-identity group (PCIG) is an integer such that $0 \leq PCIG \leq 167$.

18. The apparatus of claim 13, wherein the two sequences represent two different cyclic shifts of the same M-sequence.

19. A non-transitory computer readable storage device including instructions stored thereon, which when executed by one or more processors of a User Equipment (UE), cause the UE to perform operations to:
decode a primary synchronization signal (PSS) to obtain physical layer identity, the PSS received from an evolved Node-B (eNB);
decode a secondary synchronization signal (SSS) to obtain a physical-layer cell-identity group from two sequences, wherein the physical-layer cell-identity group is an integer, each of the two sequences taken from a set of N sequences indexed by an index pair, wherein each index in the index pair is an integer ranging from 0 to N−1;
determine a physical-layer cell identity (PCI) based on the physical layer identity and the physical-layer cell-identity group; and
perform time and frequency synchronization with a cell of the eNB based on the PSS and the SSS.

20. The non-transitory computer readable storage device of claim 19, wherein
the SSS is a 62-bit sequence comprising an interleaved concatenation of two length-31 sequences.

21. The non-transitory computer readable storage device of claim 20, wherein each of the length-31 sequences includes the two sequences, wherein each of the two sequences appears at a different even or odd position within the two length-31 sequences respectively.

22. The non-transitory computer readable storage device of claim 19, wherein N is an integer such that $0 \leq N \leq 30$.

23. The non-transitory computer readable storage device of claim 19, wherein the physical-layer cell-identity group (PCIG) is an integer such that $0 \leq PCIG \leq 167$.

24. The non-transitory computer readable storage device of claim 19, wherein the PSS and the SSS are received within slot 0 and slot 10 of a downlink frame, and wherein the one or more processors refrain from decoding PSS and SSS signalling within remaining slots of the frame.

25. The non-transitory computer readable storage device of claim 24, wherein the PSS has a fixed position at the last OFDM symbol in slots 0 and 10 of the downlink frame.

\* \* \* \* \*

UNITED STATES PATENT AND TRADEMARK OFFICE
CERTIFICATE OF CORRECTION

PATENT NO. : 10,218,470 B2
APPLICATION NO. : 15/729064
DATED : February 26, 2019
INVENTOR(S) : Onggosanusi et al.

Page 1 of 1

It is certified that error appears in the above-identified patent and that said Letters Patent is hereby corrected as shown below:

On the Title Page

Delete item "(60)" and insert --(63)-- therefor

In the Claims

Column 15, Line 32, Claim 5, delete "(PUG)" and insert --(PCIG)-- therefor

Column 17, Line 65, Claim 10, delete "UTE" and insert --UE-- therefor

Signed and Sealed this
Fourteenth Day of April, 2020

Andrei Iancu
*Director of the United States Patent and Trademark Office*